United States Patent [19]

Browning

[11] 4,117,983
[45] Oct. 3, 1978

[54] LEAF COLLECTOR AND COMMINUTOR

[76] Inventor: Paul E. Browning, 300 Station Ave., Langhorne, Pa. 19047

[21] Appl. No.: 846,119

[22] Filed: Oct. 27, 1977

[51] Int. Cl.² .............................................. B02C 13/04
[52] U.S. Cl. ...................................... 241/55; 241/100; 241/101.7; 241/190; 241/191; 241/239
[58] Field of Search ...................... 241/55, 100, 101.1, 241/101.2, 101.7, 186 R, 188 R, 189 R, 189 A, 190, 191, 239–241

[56] References Cited

U.S. PATENT DOCUMENTS

| 2,706,372 | 4/1955 | Blydenburgh | 241/188 R X |
| 3,688,479 | 9/1972 | Martinson et al. | 241/188 R UX |
| 3,963,184 | 6/1976 | Grimm | 241/190 X |
| 3,968,938 | 7/1976 | Ruhl et al. | 241/101.7 X |
| 4,074,869 | 2/1978 | Johnson | 241/101.7 X |

Primary Examiner—Howard N. Goldberg
Attorney, Agent, or Firm—Zachary T. Wobensmith, 2nd; Zachary T. Wobensmith, III

[57] ABSTRACT

A leaf collector and comminutor is disclosed having a collection receptacle in the form of a bag and a housing for delivery of comminuted tree leaves into the bag, the housing having thereon a motor driven rotary blade assembly, having a fan portion and a leaf comminuting portion resiliently mounted on the fan portion, for the suction collection and comminution of the leaves to reduce their bulk and for delivery of the disintegrated leaves into the bag, a spring held shearing bar being provided with openings for passage of end portions of the blades, the mounting of the leaf comminuting portion of the blade and the mounting of the shearing bar providing safety features in the event that sticks or stones enter the housing.

6 Claims, 4 Drawing Figures

LEAF COLLECTOR AND COMMINUTOR

BACKGROUND OF THE INVENTION

1. Field of the Invention

This invention relates to a leaf collector and comminutor and more particularly to such a device which is movable on wheels and which has a motor drive.

2. Description of the Prior Art

It has heretofore been proposed to provide lawn sweepers for collecting leaves on a lawn and to provide wheel supported vacuum cleaning equipment for the collection of leaves on a lawn for disposal.

It has also been proposed, as in the U.S. Pat. No. 3,857,521, to Aasland, et al., to provide for shredding and bagging of leaves but this requires the collection of the leaves by the user and introduction of the collected leaves into a hopper.

Buchanan, in U.S. Pat. No. 1,864,973 shows a rock breaker, which is not intended for leaf comminution and with no movement for accommodation of the rotary blades to obstacles within the fixed housing.

Miller, in U.S. Pat. No. 2,264,049, and Kost in U.S. Pat. No. 1,501,282 show hoppers for supplying material to a rotating drum for reduction in size but these have little in common with the structure herein disclosed.

Elofson, in U.S. Pat. No. 2,670,775 shows a disintegrating and scattering device with rotating arms and with blades which are swingably mounted to prevent clogging.

Martinson et al., in U.S. Pat. No. 3,688,479 show leaf comminuting apparatus with pivotally carried blades mounted in housings which limit their movement and which rotate close to the fixed blades in the housing so that they would not accommodate to sticks or stones in the housing.

Lenelson, in U.S. Pat. No. 3,877,207 shows an appliance for foliage removal and for chopping and mulching the same in which the material to be mulched moves first upwardly and then downwardly through a series of rotary anf fixed blades before upward movement into a collecting bag. The structure is much more complex and has little in common with the structure herein disclosed and makes no provision for accommodation of sticks or stones which may be picked up.

Carmichael, in U.S. Pat. No. 2,800,074, shows a compact shredding machine which is not mobile and which has a plurality of fixed blades and of coil spring urged movable arms on the rotary blades which results in unnecessary complexity of structure without compensating advantages.

It has also been proposed as in the U.S. Pat. Nos. 1,320,968, to Baudendistel Ochterbeck, 1,189,471, Dryfoos, 1,959,465 and Myrold et al., 2,815,781 to provide pivotally mounted centrifugally positioned blades but these do not function in connection with fan blades for impelling comminuted leafy material.

No wholly satisfactory device has heretofore been available for use by a householder which is mounted on wheels so that it can be moved over a leaf covered surface, and which picks up tree leaves, effects a comminution of the leaves and which delivers the comminuted leaves into a bag for delivery to a location for use or for disposal and which has provisions for avoiding injury to comminuting structure by sticks and stones.

SUMMARY OF THE INVENTION

In accordance with the invention a portable wheel supported motor operated leaf collector and comminutor is provided which includes a collection receptacle such as a bag and a housing with motor driven blades therein with leaf spring mounted cutting portions movable through a pivotally mounted spring urged leaf comminutor shearing bar, portions of the blades providing a suction action at a collecting nozzle and aiding in the delivery of the comminuted leaves to the bag.

It is the principal object of the invention to provide a portable motor driven suction operated leaf collector and comminutor suitable for quickly cleaning a leaf strewn lawn.

It is a further object of the invention to provide a leaf collector and comminutor which is simple in construction, free from likelihood of operating difficulties and which will be effective in its action.

It is a further object of the invention to provide a leaf collector and comminutor with provisions for preventing damage by sticks and stones which may enter the comminutor.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which.

Figure 1:
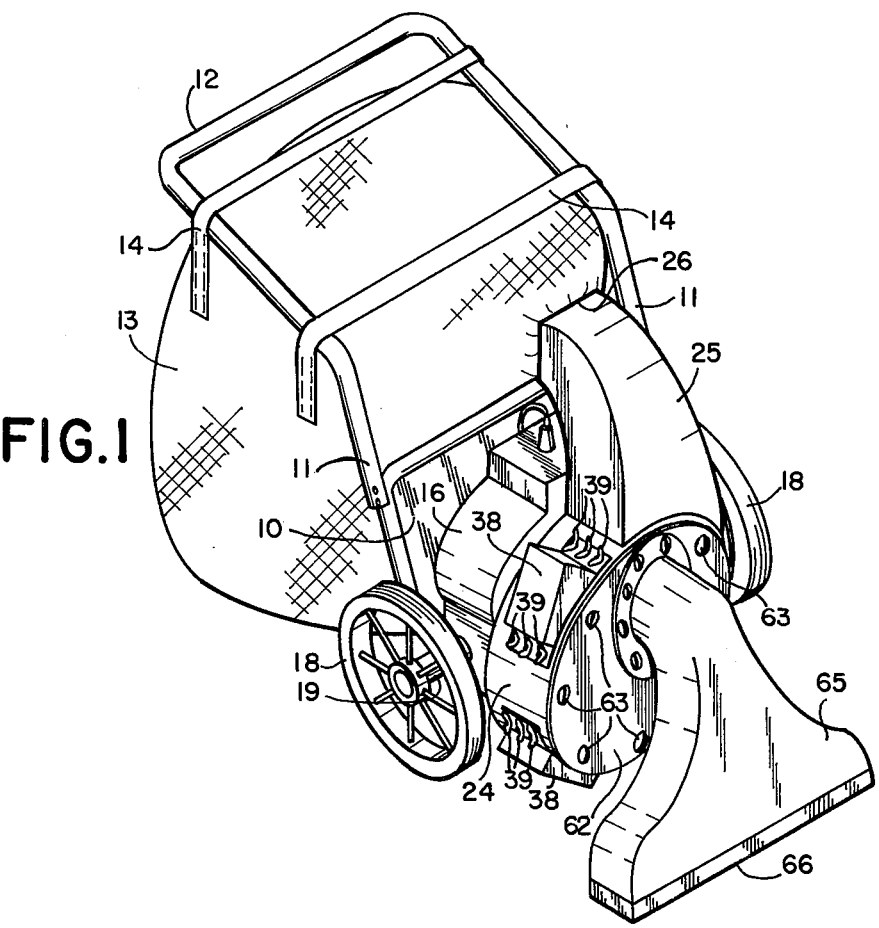
FIG. 1 is a view in perspective of a leaf collector and comminutor in accordance with the invention.

It should, of course, be understood that the description and drawings herein are illustrative merely and that various modifications and changes can be made in the structure disclosed without departing from the spirit of the invention.

Like numerals refer to like parts throughout the several views.

Description of a Preferred Embodiment

Referring now more particularly to the drawings the leaf collector and comminutor in accordance with the invention has a frame 10, which may be a frame plate, with tubular frame portions 11 extending upwardly therefrom and rearwardly with a transverse handle portion 12. The tubular frame portion 11 can support a collection receptacle 13, such as a bag, with retaining straps 14. The bag can be of porous material or can have a screen covered vent (not shown) to prevent air pressure build up therein.

A rotary gasoline engine 16 or other source of power can be employed, supported on the frame 10, and has a rotary shaft 17 driven thereby.

The frame 10 is preferably supported by spaced wheels 18, one on each side on a frame carried axle 19.

The engine 16 has a blade housing 22 mounted thereon with an end wall 23, a peripheral wall 24 and outlet duct portion 25 communicating with the interior of the bag 13 and to which the bag 13 is detachably connected by a contractable neck portion 26 of the bag 13.

The shaft 17 extends into the housing 22 at the central portion thereof and has a blade hub 27 carried thereon and held by a nut 28 on the threaded end of the shaft 17.

The blade hub 27 has extending outwardly therefrom blade carrying plates 29 which have a fan action within the housing 22. Each of the plates 29 has secured thereto by a stud 30 a flat leaf spring 31. The leaf spring 31 has secured thereto by a stud 32, for easy removal for sharpening, a blade block 33 with blades 34 extending outwardly therefrom. The blades 34 preferably have parallel flat side faces 35.

Figure 2:
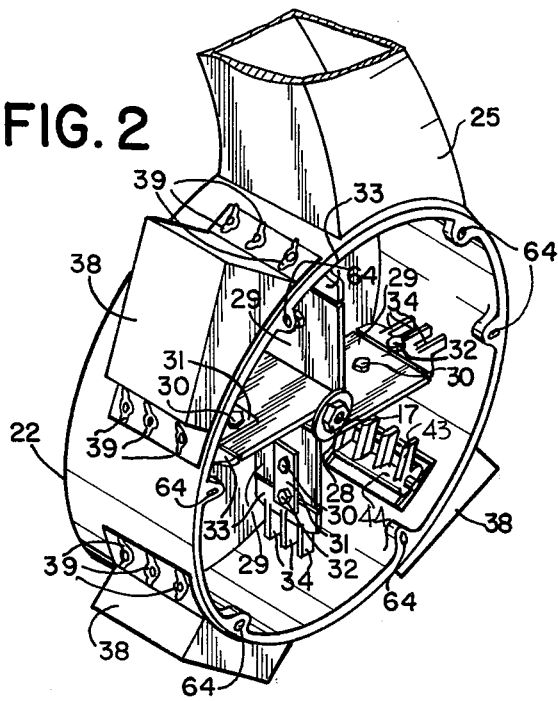
FIG. 2 is a view in perspective of the blade housing with the housing closure and collector nozzle removed therefrom and showing the inner rotary blades and the blades carried by the housing.
Figure 3:
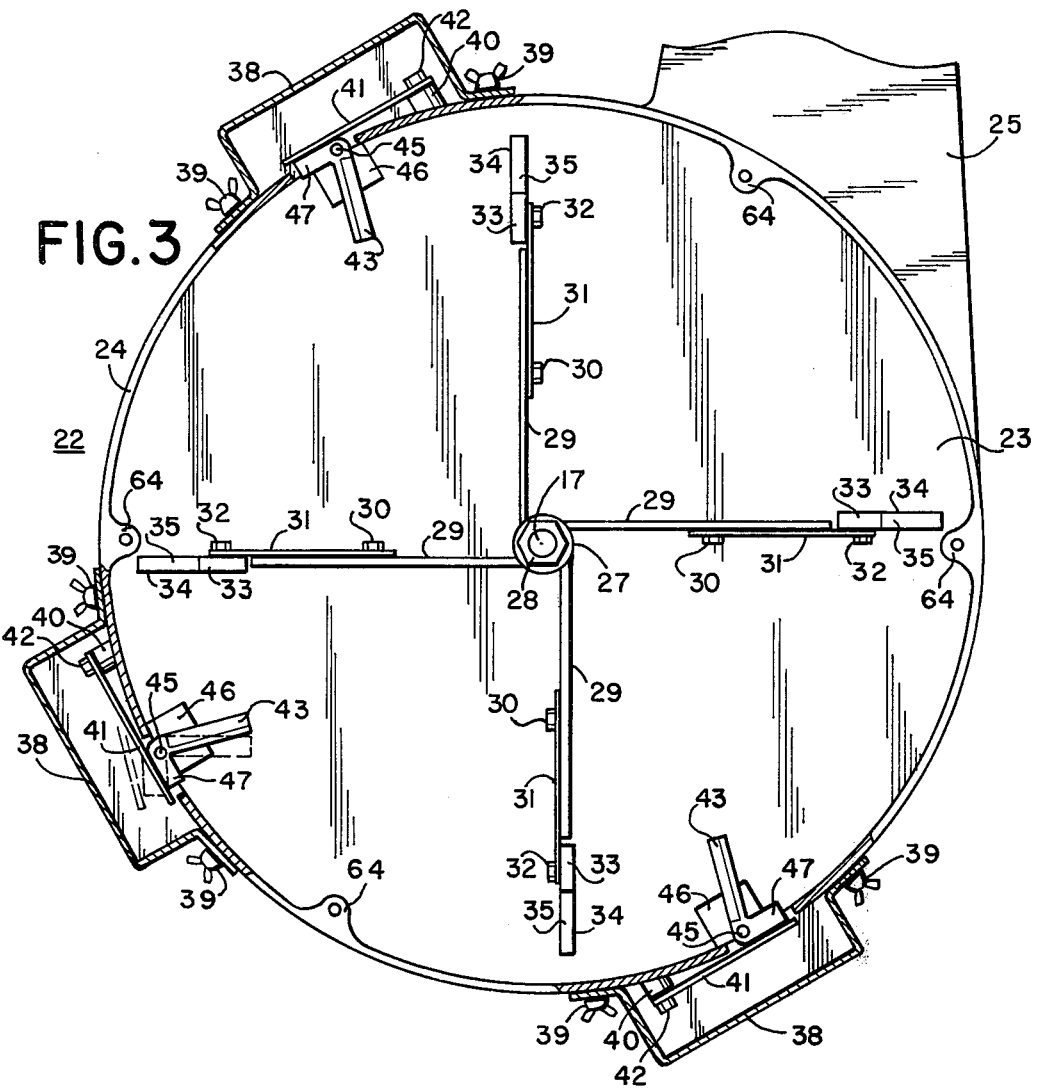
FIG. 3 is a front elevational view, enlarged, of the blade housing and blades.
Figure 4:
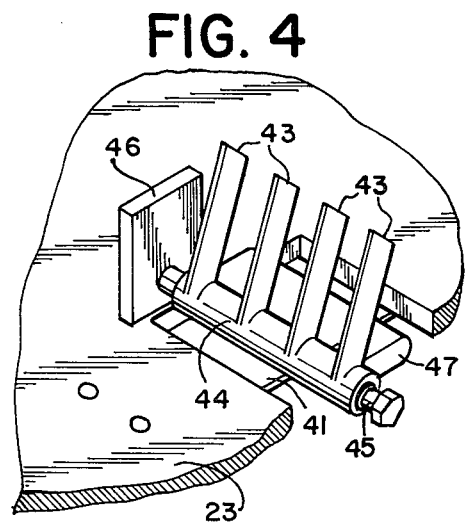
FIG. 4 is a fragmentary perspective view of one form of shearing bars carried by the blade housing.

As illustrated in FIGS. 2 and 3 three rotary blades 34 are provided on the blade blocks 33.

As also shown in FIGS. 2 and 3, at a plurality of spaced locations around the peripheral wall 24 of the housing 23, shear bar housings 38 are provided removably secured in place by bolts 39.

Mounted on the peripheral wall 24 is a boss 40 to which one end of a leaf spring 41 is secured by a stud 42.

Shear bars 43 are provided on a shear bar hub 44 which is carried on a shaft 45 mounted on a plate 46 secured to the end wall 23. The shear bars 43 are shown as relatively thin and spaced for the passage therebetween of the blades 34.

The hub 44 has an arm 47 thereon disposed at an angle to the shear bars 43 for engagement with the leaf spring 41 which permits swinging movement of the shear bars 43 and the hub 44 upon engagement of a stick or stone with the shear bars 43.

The front of the housing 22 is covered by a closure plate 62 secured in place by bolts 63 extending into lugs 64 and has a pick up nozzle 65 removably mounted thereon. The nozzle has a horizontally disposed downwardly facing open portion 66 at the bottom for pick up of leaves when the blades 34 are rotating.

The mode of operation will now be described.

When the engine 16 is operating, rotation of the shaft 17 and the blades 34 thereon is effective for creating a suction at the open portion 66 to pick up leaves and move them to the interior of the housing 23 where the action of the blades 34 at the shear bars 43 is effective to comminute the leaves and deliver the disintegrated leaves through the duct portion 24 and into the bag 13 where they are retained for disposal or use as desired.

In addition to the action of the blades 34 at the shear bars 43 the rapid rotary movement of the blades 34 also causes a breaking up of the leaves with an outward centrifugal movement imparted to the leaves and portions thereof to move them toward the duct portion 24.

In the event that sticks or stones enter the housing 23 the projection of the same against the shear bars 43 by the blades 34 causes the blades 34 to swing against the force of their mountings on leaf springs 31 and also causes a swinging of the shear bars 43 against the force of their springs 41 to permit passage thereby of the sticks or stones and thus avoids damage to the blades 34 and the shear bars 43.

The device with the hands of the operator pushing on the handle can be advanced and guided over the lawn or other surfaces for the comminution and collection of tree leaves thereon.

I claim:

1. A mobile leaf collector and comminutor comprising
   a frame,
   spaced wheels supporting said frame,
   a collection receptacle carried by said frame rearwardly of said wheels,
   a driving motor carried by said frame above said wheels and having a rotary drive shaft,
   a blade housing disposed forwardly of said wheels and into which said drive shaft extends,
   said blade housing having a portion communicating with the interior of said receptacle,
   a blade hub mounted on said shaft for rotation therewith,
   a plurality of blade members having cutting edge portions,
   a leaf spring connecting a plurality of said blade members with said blade hub for yieldingly retaining said blade members in operating position,
   a plurality of shear bars pivotally mounted on said housing and having a resilient member for yieldingly retaining said bars in operating position,
   said shear bars being spaced for passage therebetween of said blade members for comminution of leaves in said housing,
   a downwardly extending leaf pick up nozzle carried by and extending forwardly of said housing and having a horizontal opening for entry of leaves and delivery of leaves to the interior of said housing, and
   said blade hub having an associated fan portion for drawing leaves into said housing and delivery of comminuted leaves into said receptacle.

2. A mobile leaf collector and comminutor as defined in claim 1 in which
   said collection receptacle is a bag with portions for discharge of air delivered thereto from said blade housing.

3. A mobile leaf collector and comminutor as defined in claim 1 in which
   said blade hub has a plurality of plates extending therefrom constituting said fan portion,
   a blade block is provided carrying a plurality of said blade members, and
   said leaf spring is connected to one of said plates and to one of said blade blocks.

4. A mobile leaf collector and comminutor as defined in claim 1 in which
   mounting plates are provided on said blade housing,
   said shear bars are pivotally mounted on said mounting plates, and
   said resilient member is a leaf spring.

5. A mobile leaf collector and comminutor as defined in claim 1 in which
   a plurality of said shear bars are provided at spaced locations around the periphery of said housing for successive passage of said blades.

6. A mobile leaf collector and comminutor as defined in claim 1 in which
   a plurality of said shear bars are mounted on a shear bar hub,
   said shear bar hub is pivotally mounted on said housing, and
   said shear bar hub has a portion extending therefrom for applying a force on said resilient member.

* * * * *